United States Patent [19]

Sjoholm et al.

[11] 4,136,886
[45] Jan. 30, 1979

[54] ARRANGEMENT FOR CLEANING A SEALING RING ON A SHAFT

[75] Inventors: Claes B. Sjoholm, Malmo; Karl J. G. Martensson, Lund, both of Sweden

[73] Assignee: Alfa-Laval AB, Tumba, Sweden

[21] Appl. No.: 880,363

[22] Filed: Feb. 23, 1978

[30] Foreign Application Priority Data

Feb. 25, 1977 [SE] Sweden .................. 7702087

[51] Int. Cl.² .................. F16J 15/32; F16J 15/40
[52] U.S. Cl. .................. 277/24; 277/15; 277/59; 277/68; 277/72 R
[58] Field of Search .................. 277/15, 24, 59, 70, 277/71, 72 R, 72 FM, 74, 75, 79, 152, 165, 208, 3, 68; 239/104, 110, 112

[56] References Cited

U.S. PATENT DOCUMENTS

| 3,003,506 | 10/1961 | Wosicki | 239/104 X |
|---|---|---|---|
| 3,081,095 | 3/1963 | Hamrick | 277/59 X |
| 3,088,744 | 5/1963 | Ezekiel et al. | 277/15 X |
| 3,218,085 | 11/1965 | Grace | 277/59 |
| 3,219,273 | 11/1965 | Killen | 239/112 X |
| 3,521,890 | 7/1970 | Holmes et al. | 277/59 X |
| 3,599,993 | 8/1971 | Eriksson | 277/59 |
| 3,726,531 | 4/1973 | Pagan et al. | 277/59 |
| 3,934,311 | 1/1976 | Tompson | 277/59 X |

*Primary Examiner*—Robert S. Ward, Jr.
*Attorney, Agent, or Firm*—Cyrus S. Hapgood

[57] ABSTRACT

A rotatable shaft extends from the interior of a receptacle through a wall thereof forming a closed chamber surrounding the shaft; and a first sealing ring surrounding the shaft is operable to prevent flow into the chamber from the receptacle interior but to allow flow in the opposite direction, a second sealing ring surrounding the shaft to prevent flow from the chamber in the axial direction away from the receptacle interior. Valve means are operable selectively to connect the chamber to either a cleaning liquid supply source or a draining passage or to disconnect the chamber simultaneously from both said source and passage.

6 Claims, 3 Drawing Figures

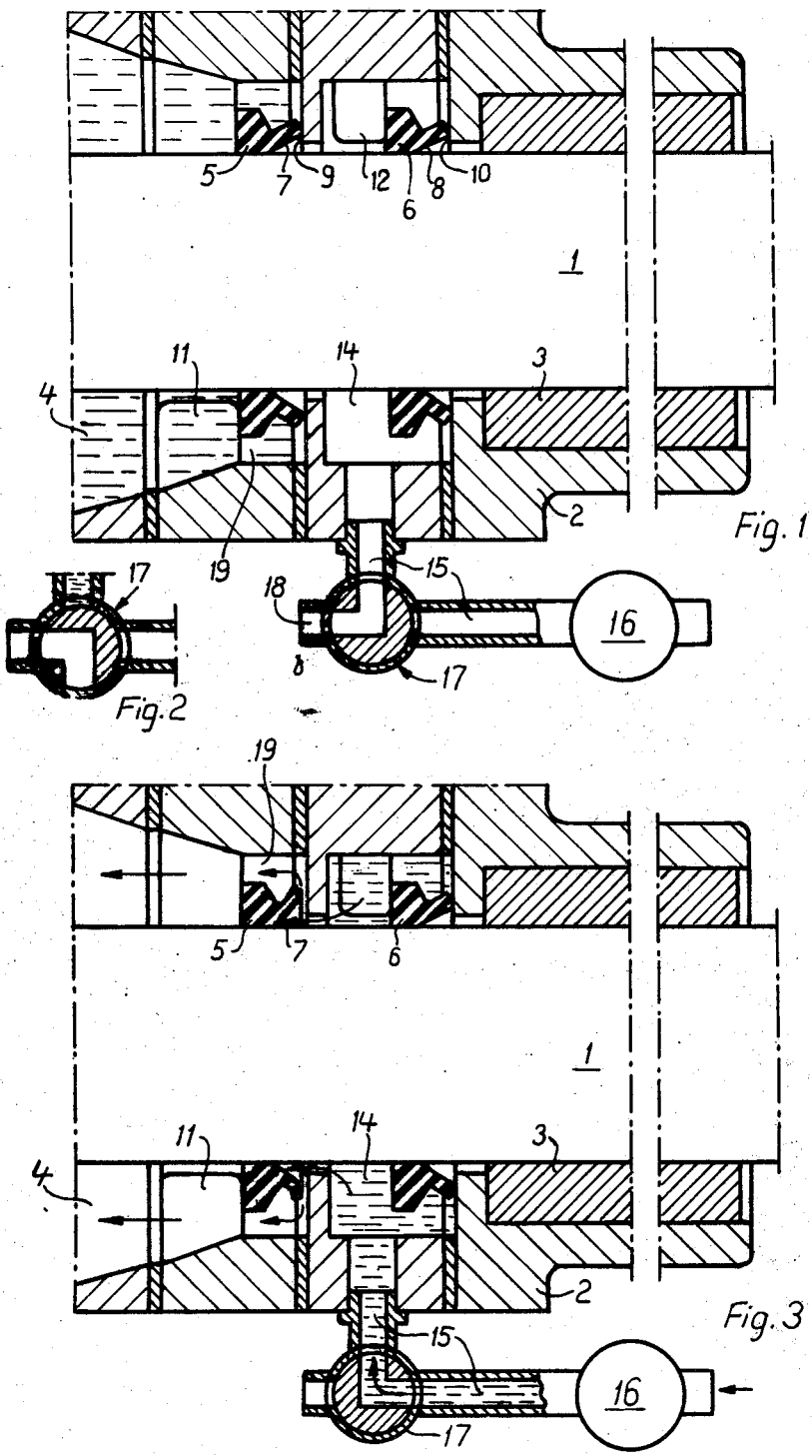

ARRANGEMENT FOR CLEANING A SEALING RING ON A SHAFT

This invention relates to an arrangement for cleaning a first sealing ring and a space adjoining the sealing ring, which sealing ring is arranged around a rotatable shaft passing through a wall of a receptacle.

Such a sealing ring may be used, for example, in a mixing receptacle for jam, where the sealing ring is arranged to prevent the jam from forcing its way out of the receptacle along a rotatable shaft of a stirrer for the jam, the shaft being driven from the outside of the receptacle.

Such a receptacle must be cleaned internally from time to time; but it can be difficult to reach the sealing ring and the space adjoining the sealing ring with the cleaning liquid.

The object of the present invention is to provide an arrangement by which the sealing ring and the space adjoining it can be readily cleaned.

In an arrangement according to the invention, the sealing ring is of a type known per se which prevents a medium from forcing its way out of the receptacle past the sealing ring but which allows a medium to force its way past the sealing ring into the receptacle; and a closed chamber arranged around the shaft outside the sealing ring is connected via a channel to a device for supplying cleaning liquid to the chamber, the shaft extending out of the closed chamber and being surrounded by a second sealing ring which is arranged so that it prevents medium from forcing its way out of the chamber in the direction away from the receptacle.

The first sealing ring and the space adjoining it is cleaned by introducing cleaning liquid under pressure through the above-mentioned channel, whereby cleaning liquid, simultaneously as it cleans, will force its way past the first sealing ring and flow into the receptacle. During the cleaning, the second sealing ring prevents the cleaning liquid from forcing its way out from said chamber in the direction away from the receptacle and damaging bearings for the shaft, which bearings are suitably arranged outside said chamber.

According to a further development of the invention, the first sealing ring is arranged on the shaft for rotation with it and has an elastic annular lip which seals in the axial direction against a substantially radial surface which is stationary relative to the receptacle wall. By this arrangement of the sealing ring, the cleaning liquid will be forced to flow along the outside of the sealing ring, whereby both the sealing ring and the space adjoining it will be effectively cleaned. Furthermore, the arrangement has a simple structure.

According to another development of the invention, the second sealing ring is arranged on the shaft for rotation with it and has an elastic annular lip which seals in the axial direction against a substantially radial surface which is stationary relative to the wall. The second sealing ring can be identical to the first sealing ring, which among other things is an advantage from the point of view of furnishing spare parts.

According to still another development of the invention, the channel is provided with a valve by which the chamber can be brought into communication with a passage for draining off and indicating leakage of medium which may leak out of the receptacle past the first sealing ring. This arrangement provides a simple means for indicating leakage at the first sealing ring.

According to a further development of the invention, the channel is provided with a valve by which the chamber can be closed completely, whereby the operation of the rotatable shaft need not be interrupted immediately if it is discovered that a leakage has occurred at the first sealing ring. Instead, the channel is temporarily shut off and the other sealing ring acts as a sealing outwards for medium which has leaked into the chamber, until a normal interruption of the operation of the shaft can be made, whereupon overhaul and replacement of the first (and, if necessary, the second) sealing ring can be effected.

An embodiment of the invention is described below in connection with the attached drawing, in which FIG. 1 is a sectional view of a receptacle wall with a passage for a shaft and with an arrangement for supplying cleaning liquid via a channel to the passage;

FIG. 2 is a sectional view of a valve which is arranged in the channel and in a position which shuts off the channel; and FIG. 3 is a view similar to FIG. 1 but showing the arrangement when cleaning liquid is supplied through the channel to the passage for the shaft.

Referring to the drawing, a rotatable shaft 1 passes through a wall 2 of a mixing receptacle and is journalled in the wall by a bearing 3. The wall 2 encloses a space 4 which contains a flowable medium. The medium is prevented from forcing its way out of the receptacle by an elastic sealing ring 5 which is arranged on the shaft 1 for rotation with it and which has an elastic annular lip 7 which seals in the axial direction against a radial surface 9 of the wall 2. The ring 5 is prevented from moving away in the axial direction from the surface 9 by a shoulder 11 which is stationary relative to the wall 2.

Outside the sealing ring 5, a chamber 14 is arranged in the wall. In the chamber 14 an elastic sealing ring 6 is arranged on the shaft 1 for rotation with it. The ring 6 has an elastic annular lip 8 which seals in the axial direction against a radial surface 10 of the wall 2. The ring 6, which preferably is identical to the ring 5, prevents medium in the chamber 14 from forcing its way out of the receptacle via the bearing 3.

The chamber 14 is connected, via a channel 15, to a device 16, such as a pump, for supplying cleaning liquid to the chamber. The channel 15 is provided with a valve 17 which can (a) connect the chamber 14 with a passage 18 (FIG. 1) or (b) close the chamber 14 completely (FIG. 2) or (c) connect the chamber 14 with the device 16 for supplying cleaning liquid (FIG. 3).

To clean the sealing ring 5 and a space 19 adjoining the sealing ring 5, the space 4 is first emptied of its contents, and then the valve 17 is set in the position shown in FIG. 3, after which cleaning liquid is supplied to the chamber 14 by the device 16. The cleaning liquid, which is prevented from forcing its way into the bearing 3 by the sealing ring 6, presses the sealing lip 7 of the ring 5 aside and flows into the space 4, whereby both the ring 5 and the space 19 will be cleaned. Simultaneously, the chamber 14 and the ring 6 will also be exposed to the cleaning liquid and be cleaned.

During normal operation of the receptacle, the valve 17 is set in the position shown in FIG. 1. With this setting, if the sealing ring 5 should be damaged and the medium in space 4 passes into the chamber 14, the medium will continue to and through the passage 18 and thus indicate that the ring 5 is damaged.

The operation of the shaft 1 need not be interrupted immediately for replacement of the ring 5. The preferred procedure is to temporarily shut off the channel 15 (FIG. 2) and let the ring 6 act as a sealing toward the bearing 3 until a normal interruption of the operation of the shaft 1 is made, whereupon overhaul and replacement of the sealing ring 5 (and suitably also of the ring 6) can be effected.

The arrangement according to the invention is also suitable for use with curdling receptacles, where cleanability and hygiene are of primary interest, as in the case of the abovementioned mixing receptacle.

We claim:

1. The combination of a receptacle having a wall, a rotatable shaft passing through said wall into the interior of the receptacle, a first sealing ring surrounding the shaft, said ring being of the type which prevents a flowable medium from forcing its way from the interior of the receptacle past the ring but allows a flowable medium to force its way past the ring into the interior of the receptacle, said receptacle wall forming a closed chamber surrounding the shaft outside said sealing ring, a device connected to said closed chamber for supplying cleaning liquid thereto, the shaft having a portion extending out of the closed chamber and away from the receptacle interior, and a second sealing ring surrounding said shaft portion within said wall and operable to prevent a flowable medium from forcing its way out of said chamber in the direction away from the receptacle interior.

2. The combination of claim 1, in which said wall has a part forming a substantially radial surface which is stationary relative to the wall, said first sealing ring being rotatable with the shaft and having an elastic annular lip which seals in the axial direction against said surface.

3. The combination of claim 1, in which said wall has a part forming a substantially radial surface which is stationary relative to the wall, said second sealing ring being rotatable with the shaft and having an elastic annular lip which seals in the axial direction against said surface.

4. The combination of claim 1, comprising also means forming a passage for draining off and indicating leakage of medium which may leak from the receptacle interior past the first sealing ring, and valve means connected to said chamber and operable to bring the chamber into communication with said passage.

5. The combination of claim 1, comprising also valve means through which said device supplies cleaning liquid to said chamber, the valve means being operable to close the chamber from said device.

6. The combination of claim 4, in which said valve means are operable selectively to connect the chamber to said device while disconnecting the chamber from said passage, to connect the chamber to said passage while disconnecting the chamber from said device, and to disconnect the chamber simultaneously from both said device and said passage.

* * * * *